United States Patent
Toeroe

(10) Patent No.: US 11,916,744 B2
(45) Date of Patent: Feb. 27, 2024

(54) TECHNIQUE FOR REPLACING VNFMS IN A VNF BASED ENVIRONMENT

(71) Applicant: TELEFONAKTIEBOLAGET LM ERICSSON (PUBL), Stockholm (SE)

(72) Inventor: Maria Toeroe, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/775,171

(22) PCT Filed: Nov. 25, 2020

(86) PCT No.: PCT/EP2020/083344
§ 371 (c)(1),
(2) Date: May 6, 2022

(87) PCT Pub. No.: WO2021/105201
PCT Pub. Date: Jun. 3, 2021

(65) Prior Publication Data
US 2022/0393946 A1      Dec. 8, 2022

Related U.S. Application Data

(60) Provisional application No. 62/939,954, filed on Nov. 25, 2019.

(51) Int. Cl.
*H04L 41/0897* (2022.01)
*H04L 41/0895* (2022.01)
*H04L 41/082* (2022.01)

(52) U.S. Cl.
CPC ........ *H04L 41/0897* (2022.05); *H04L 41/082* (2013.01); *H04L 41/0895* (2022.05)

(58) Field of Classification Search
None
See application file for complete search history.

(56) References Cited

U.S. PATENT DOCUMENTS 6,684,336 B1 * 1/2004 Banks ................. H04L 12/2874
713/168
6,888,937 B1 * 5/2005 Kurapati ................. H04M 7/06
379/221.03

(Continued)

FOREIGN PATENT DOCUMENTS

CN          104410672 B       11/2017
EP          3358790 B1        3/2020
(Continued)

OTHER PUBLICATIONS

ISR and Written Opinion dated Feb. 18, 2021 from corresponding application PCT/EP2020/083344.

*Primary Examiner* — Ranodhi Serrao

(57) ABSTRACT

A technique for replacing a source Virtualized Network Function Manager, VNFM, managing a source Virtualized Network Function, VNF, in a VNF based environment by a target VNFM is disclosed. A method implementation of the technique comprises the steps of triggering (S302) instantiating a target VNF, the target VNF being managed by the target VNFM and being executed in parallel to the source VNF, triggering (S304) redirecting traffic from the source VNF to the target VNF in accordance with a traffic redirection schedule, triggering (S306) terminating the source VNF when redirecting traffic from the source VNF to the target VNF is complete, and triggering (S308) terminating the source VNFM.

20 Claims, 5 Drawing Sheets

(56) References Cited

U.S. PATENT DOCUMENTS

| | | | | |
|---|---|---|---|---|
| 7,433,899 | B2* | 10/2008 | Pearson | G06F 11/2094 707/999.203 |
| 7,437,723 | B1* | 10/2008 | Kihara | H04L 41/0803 717/124 |
| 8,233,436 | B2* | 7/2012 | Racz | H04W 92/12 370/328 |
| 9,578,008 | B2* | 2/2017 | Sood | H04L 9/30 |
| 9,674,639 | B2* | 6/2017 | Qiu | H04L 67/51 |
| 10,999,161 | B2* | 5/2021 | Lacey | H04L 41/5041 |
| 11,082,244 | B2* | 8/2021 | McNamee | H04W 12/041 |
| 11,177,996 | B2* | 11/2021 | Huang | G06N 3/006 |
| 11,381,669 | B2* | 7/2022 | Cook | H04B 10/27 |
| 11,397,605 | B2* | 7/2022 | Miyakoshi | H04L 43/0876 |
| 11,398,968 | B2* | 7/2022 | Laslau | H04L 43/20 |
| 11,558,248 | B2* | 1/2023 | Toeroe | H04L 41/0895 |
| 2003/0028545 | A1 | 2/2003 | Wang | G06F 16/284 |
| 2003/0149961 | A1* | 8/2003 | Kawai | G06F 11/3648 717/125 |
| 2003/0220936 | A1* | 11/2003 | Gifford | G06F 16/258 |
| 2004/0177130 | A1* | 9/2004 | Chambliss | H04L 9/40 709/219 |
| 2006/0161768 | A1* | 7/2006 | Baissus | G06F 8/20 713/152 |
| 2007/0283331 | A1* | 12/2007 | Pietrek | G06F 9/4486 717/130 |
| 2011/0142055 | A1* | 6/2011 | Feder | G06F 16/178 370/400 |
| 2016/0112261 | A1* | 4/2016 | Amato | H04L 41/0869 709/220 |
| 2016/0150421 | A1* | 5/2016 | Li | H04L 41/0896 370/252 |
| 2016/0226913 | A1* | 8/2016 | Sood | H04L 63/1408 |
| 2016/0248858 | A1* | 8/2016 | Qiu | H04W 4/60 |
| 2016/0335111 | A1* | 11/2016 | Bruun | H04L 41/50 |
| 2016/0337329 | A1* | 11/2016 | Sood | H04L 63/06 |
| 2017/0142163 | A1* | 5/2017 | Sood | H04Q 9/00 |
| 2017/0237819 | A1* | 8/2017 | Qiu | H04L 67/51 709/223 |
| 2017/0257276 | A1* | 9/2017 | Chou | G06F 9/45558 |
| 2017/0288972 | A1* | 10/2017 | Li | H04W 36/22 |
| 2018/0176115 | A1 | 6/2018 | Yang | |
| 2018/0206159 | A1* | 7/2018 | Vrzic | H04W 36/32 |
| 2018/0241635 | A1 | 8/2018 | Rao | |
| 2018/0253332 | A1* | 9/2018 | Andrianov | G06F 9/45558 |
| 2018/0367372 | A1* | 12/2018 | Chou | H04L 41/0681 |
| 2019/0028502 | A1* | 1/2019 | Bihannic | H04L 63/1425 |
| 2019/0223055 | A1* | 7/2019 | Bor Yaliniz | H04W 48/16 |
| 2020/0412637 | A1* | 12/2020 | Cherunni | G06F 9/45558 |
| 2021/0105669 | A1* | 4/2021 | Witzel | H04W 36/08 |

FOREIGN PATENT DOCUMENTS

| | | |
|---|---|---|
| EP | 3518465 B1 | 12/2020 |
| WO | 2018225037 A1 | 12/2018 |

* cited by examiner

TECHNIQUE FOR REPLACING VNFMS IN A VNF BASED ENVIRONMENT

TECHNICAL FIELD

The present disclosure generally relates to Virtualized Network Function (VNF) based environments. In particular, a technique for replacing a source Virtualized Network Function Manager (VNFM) managing a source VNF in a VNF based environment by a target VNFM is presented. The technique may be embodied in methods, computer programs, apparatuses and systems.

BACKGROUND

Network Functions Virtualization (NFV) has evolved as a network architectural concept that uses virtualization technology to virtualize classes of network functions into functional blocks that may connect, or be chained together, to create network services. In traditional networks, network function implementations are typically coupled tightly to the physical infrastructure they run on. NFV decouples software implementations of network functions from the computation, storage and network resources they use and virtualization insulates the network functions from these resources through a virtualization layer. The decoupling exposes a new set of entities, the so called VNFs, which can be chained with other VNFs and/or Physical Network Functions (PNFs) to realize a Network Service (NS).

FIG. 1 illustrates an architectural framework in accordance with the European Telecommunications Standards Institute (ETSI) NFV specification. As shown, VNFs can be deployed on a Network Functions Virtualization Infrastructure (NFVI). A VNF is responsible for handling specific network functions that run on a virtualization layer, e.g., on one or more virtual machines (VMs) executed on top of the hardware infrastructure provided by the NFVI (e.g., compute, storage and network). Element Managers (EMs) may be employed for the management of actual network applications residing in the VNFs. A Network Functions Virtualization Management and Orchestration (NFV-MANO) framework is used to manage the NFVI and orchestrate the allocation of resources needed by the NSs and their VNFs. Typical entities employed in the NFV-MANO framework include VNFMs which are responsible for lifecycle management of VNF instances composing the NSs, Virtualized Infrastructure Managers (VIMs) which are responsible for controlling and managing the NFVI resources on which the NSs and their VNFs are deployed, and an NFV Orchestrator (NFVO) which is responsible for orchestration of NFVI resources across multiple VIMs as well as lifecycle management of NSs, e.g., on request of an Operations Support System (OSS) or Business Support System (BSS).

The ETSI GS NFV-IFA 009 specification (e.g., ETSI GS NFV-IFA 009 v1.1.1) describes different architectural options for deploying the NFV-MANO, and one of these options is related to VNFMs. According to this option, a VNFM may be a Generic VNFM (G-VNFM) or a Specific (or "Specialized") VNFM (S-VNFM), wherein a G-VNFM implements the management services and interacts with its managed VNFs using a standardized interface, such as an interface standardized by the ETSI NFV GS IFA-008 specification (e.g., ETSI GS NFV-IFA 008 v3.3.1). An S-VNFM, on the other hand, may be designed to manage a specific set of VNFs and, therefore, the management services and the interfaces between these VNFs and the S-VNFM may be tailored to the needs of those specific VNFs. These interfaces may be proprietary and differ from the ETSI NFV GS IFA-008 specification.

The goal of software modifications may nowadays be directed to changing the currently deployed architectural option to an alternative one, such as moving away from the use of S-VNFMs and replacing them with one or more G-VNFMs, for example. In other words, the goal may be to transition from an S-VNFM managed deployment to a G-VNFM managed deployment, for example. However, problems with software modifications may arise due to non-backward compatible interfaces which, in fact, may not only occur due to architectural changes, but also due to changes in the standard specifications, or the standardization of Application Programming Interfaces (APIs) that were not standardized yet. For example, a VNF managed by an S-VNFM can only interact with its S-VNFM, and this S-VNFM cannot be easily replaced by a G-VNFM without affecting the VNF's operation or without service impact in general.

SUMMARY

Accordingly, there is a need for a technique for replacing VNFMs in a VNF based environment which avoids one or more of the problems discussed above, or other problems.

According to a first aspect, a method for replacing a source VNFM managing a source VNF in a VNF based environment by a target VNFM is provided. The method comprises the steps of (a) triggering instantiating a target VNF, the target VNF being managed by the target VNFM and being executed in parallel to the source VNF, (b) triggering redirecting traffic from the source VNF to the target VNF in accordance with a traffic redirection schedule, (c) triggering terminating the source VNF when redirecting traffic from the source VNF to the target VNF is complete, and (d) triggering terminating the source VNFM.

The source VNFM may be replaced by the target VNFM as part of a software modification process transitioning at least a subsystem of the VNF based environment from a source VNFM managed deployment to a target VNFM managed deployment. The source VNF may not support interaction with the target VNFM and the target VNF may be an updated version of the source VNF which supports interaction with the target VNFM. The source VNFM may be an S-VNFM and the target VNFM may be a G-VNFM. In another variant, the source VNFM may be a G-VNFM and the target VNFM may be an updated version of the G-VNFM.

The method may further comprise one of triggering instantiating the target VNFM as a new target VNFM instance, and triggering selecting the target VNFM among existing target VNFM instances having sufficient capacity to manage the target VNF. Triggering instantiating the target VNF may include triggering instantiating the target VNF via the target VNFM. Triggering instantiating the target VNF may include triggering updating a Network Service Descriptor (NSD) to reflect a redundant traffic path via both the source VNF and the target VNF, and triggering deploying the NSD in the VNF based environment.

In accordance with the traffic redirection schedule, traffic may be redirected successively from the source VNF to the target VNF. Also, in accordance with the traffic redirection schedule, requests initially served by the source VNF may be served by the source VNF until their completion and requests initiated after instantiation of the target VNF may be directed to the target VNF. Triggering terminating the source VNF may include triggering updating an NSD to reflect removal of a redundant traffic path via both the source VNF and the target VNF, and triggering deploying the NSD in the VNF based environment.

The method may further comprise triggering performing a rollback of one or more of steps (a) to (d) in reverse order in case of a failure of at least one of the target VNF and the target VNFM. Triggering performing the rollback may comprise, when at least one of the source VNF and the source VNFM are already terminated, triggering instantiating the at least one of the source VNF and the source VNFM, and triggering redirecting traffic from the target VNF to the source VNF.

The method may further comprise triggering defining, prior to triggering instantiating the target VNF, a restoration point from which operation can be resumed in case of a failure of at least one of the target VNF and the target VNFM. Triggering defining the restoration point may include one of triggering creating the restoration point as a new restoration point comprising a backup of at least one of the source VNF and the source VNFM, and triggering selecting the restoration point among existing restoration points each comprising a backup of at least one of the source VNF and the source VNFM.

The source VNFM may be terminated if the source VNFM does not manage any other VNF. The source VNF may be one of a plurality of source VNFs managed by the source VNFM, wherein steps (a) to (c) may be performed for each of the source VNFs to redirect traffic to respectively instantiated target VNFs before triggering terminating the source VNFM.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for replacing a source VNFM managing a source VNF in a VNF based environment by a target VNFM is provided. The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
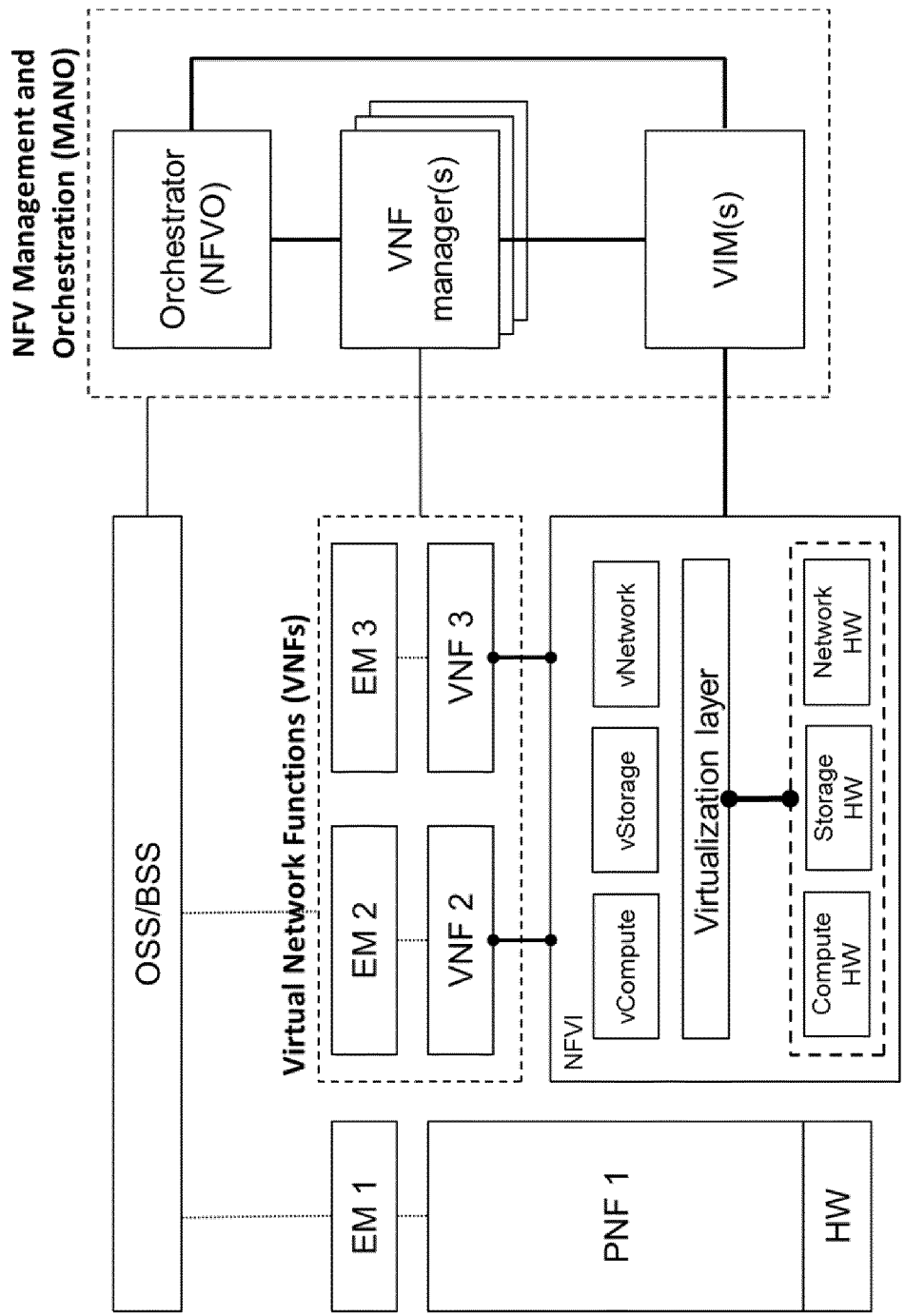
FIG. 1 illustrates an architectural framework in accordance with the ETSI NFV specification.
Figure 2:
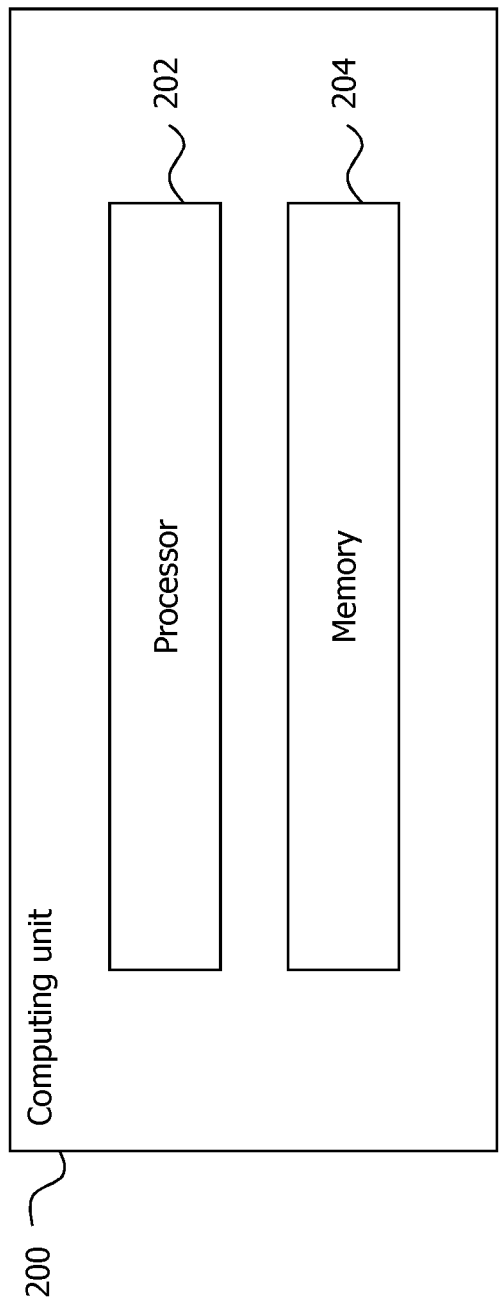
FIG. 2 illustrates an exemplary composition of a computing unit for replacing a source VNFM by a target VNFM according to the present disclosure.

FIG. 2 schematically illustrates an exemplary composition of a computing unit 200 for replacing a source VNFM managing a source VNF in a VNF based environment by a target VNFM. The computing unit 200 comprises at least one processor 202 and at least one memory 204, wherein the at least one memory 204 contains instructions executable by the at least one processor 202 such that the computing unit 200 is operable to carry out the method steps described herein below.

It will be understood that the computing unit 200 may be implemented on a physical computing unit or a virtualized computing unit, such as a virtual machine, for example. It will further be appreciated that the computing unit 200 may not necessarily be implemented on a standalone computing unit, but may be implemented as components—realized in software and/or hardware—residing on multiple distributed computing units as well, such as in a cloud computing environment, for example.

Figure 3:
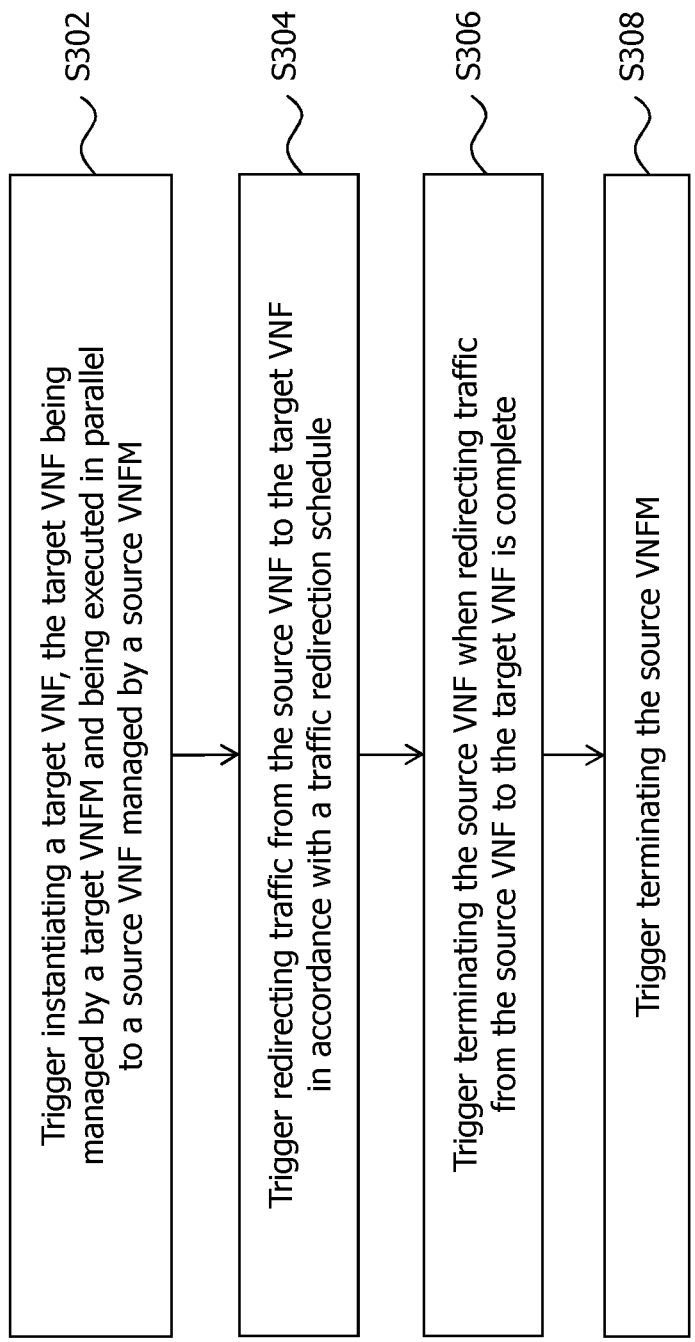
FIG. 3 illustrates a method which may be performed by the computing unit according to the present disclosure.

FIG. 3 illustrates a method which may be performed by the computing unit 200 according to the present disclosure. The method is dedicated to replacing a source VNFM managing a source VNF in a VNF based environment by a target VNFM. In step S302, the computing unit 200 may (a) trigger instantiating a target VNF, the target VNF being managed by the target VNFM and being executed in parallel to the source VNF. In step S304, the computing unit 200 may (b) trigger redirecting traffic from the source VNF to the target VNF in accordance with a traffic redirection schedule. In step S306, the computing unit 200 may (c) trigger terminating the source VNF when redirecting traffic from the source VNF to the target VNF is complete. In step S308, the computing unit 200 may (d) trigger terminating the source VNFM.

After terminating the source VNFM, the target VNFM may persist and, since traffic may be redirected from a VNF that was under management of the source VNFM (i.e., the source VNF) to a VNF which is under management of the target VNFM (i.e., the target VNF), the target VNF and the target VNFM may take over the previous functions of the source VNF and the source VNFM in the VNF based environment and the target VNFM may thereby replace the source VNFM. In other words, by instantiating the target VNF, redirecting traffic from the source VNF to the target VNF, and terminating the source VNF once the traffic is fully redirected from the source VNF to the target VNF, the target VNF may take over the (e.g., traffic handling) function of the source VNF and, as the target VNF is managed by the target VNFM, the target VNFM may take over the (e.g., management) function of a VNFM managing a VNF handling the original function of the source VNF, which previously was the source VNFM.

Instantiating the target VNF may in other words be performed to temporarily scale out the source VNF in the underlying NS (i.e., the NS to which the source VNF belongs) until all traffic is redirected to the target VNF and, afterwards, a scale in operation may be performed to remove the source VNF. Since the source VNFM may not be needed anymore either, the source VNFM may be removed as well. As scale out/in operations which add/remove VNFs in NSs generally represent non-service-disruptive operations, the VNFM replacement technique presented herein may be performed without service impact in the underlying NS.

Thus, instead of replacing the source VNFM by exclusively exchanging the source VNFM with the target VNFM (and not the VNFs managed by the VNFMs)—which may cause service impacts negatively affecting the VNF operation due to interface incompatibilities between the target VNFM and the source VNF, as described above—the proposed technique may provide a non-service-disruptive operation for replacing a source VNFM by a target VNFM in a VNF based environment. Initially scaling out the source VNF and, later on, scaling in the source VNF once traffic is completely shifted to the target VNF may therefore be used as a measure to implement the replacement of the source VNFM by the target VNFM in a non-disruptive manner, wherein it may be ensured at the same time that the persisting VNF (i.e., the target VNF) supports the interface of the persisting VNFM (i.e., the target VNFM) and may thus be able to duly interact with the persisting VNFM.

In still other words, in order to replace an original VNFM by a new VNFM without service impact, the VNFM replacement may be performed together with a replacement of the managed VNF, wherein the original VNF may be scaled out in the NS by adding a new VNF that is managed by the new VNFM, while the original VNF remains under management of the original VNFM. While the original VNF and the new VNF are then executed in parallel, a redundant traffic path may be established via both the original VNF and the new VNF and traffic may be distributed between the original and new instances of the VNF until eventually the new VNF handles all the traffic. At this point, the original VNF and the original VNFM may be removed.

As said, the goal of software modifications in a VNF based environment may generally be directed to changing a deployed architectural option in the NFV-MANO, such as moving away from the use of source VNFMs and replacing them with target VNFMs, for example. The source VNFM may thus be replaced by the target VNFM as part of a software modification process transitioning at least a subsystem of the VNF based environment from a source VNFM managed deployment to a target VNFM managed deployment. Scaling out the source VNF by instantiating the target VNF may be necessary because the source VNF may not support an interface of the target VNFM required to interact with the target VNFM and the target VNF may be instantiated as a new version of the source VNF that is capable of interacting with the target VNFM. For example, the target VNF may support (e.g., all) functionality implemented by the source VNF and additionally support the interface of the target VNFM. As such, the source VNF may not support interaction with the target VNF and the target VNF may be an updated version of the source VNF which supports interaction with the target VNFM.

In one variant, the source VNFM may be an S-VNFM and the target VNFM may be a G-VNFM. In this case, the S-VNFM may be replaced by a G-VNFM as part of a software modification process transitioning at least a subsystem of the VNF based environment from an S-VNFM managed deployment to a G-VNFM managed deployment. The S-VNFM and the G-VNFM may be defined in accordance with the ETSI GS NFV-IFA 009 specification (e.g., ETSI GS NFV-IFA 009 v1.1.1 or any successor version thereof) and, as such, the S-VNFM may be a specific VNFM which manages the source VNF using a proprietary interface and the G-VNFM may be a generic VNFM which manages the target VNF using a standardized interface, such as an interface standardized by the ETSI NFV GS IFA-008 specification (e.g., ETSI GS NFV-IFA 008 v3.3.1 or any successor versions thereof).

It will be understood that other variants of the source VNFM and the target VNFM may be conceivable. In one such other variant, the source VNFM may be a G-VNFM and the target VNFM may be an updated version of the G-VNFM. In this variant, there may be no change in the interface towards the managed VNF, but a new version of the G-VNFM may become available. In this case, the source VNF may support the interface of the target VNFM, but scaling out the source VNF may nevertheless be required since the new version of the G-VNFM may use a different data model to which the VNF needs to be adopted, for example. Thus, in such a case, when the source VNF is scaled out, the same VNF version as the original source VNF may be instantiated as the target VNF, which may then be managed by the new version of the G-VNFM, e.g., based on an updated data model.

The VNFM to be used as the target VNFM may be an already existing VNFM or may be newly instantiated. The method may thus further comprise (e.g., prior to triggering instantiating the target VNF) one of triggering instantiating the target VNFM as a new target VNFM instance, and triggering selecting the target VNFM among existing target VNFM instances having sufficient capacity to manage the target VNF.

The method described herein may be performed by a managing entity, such as an entity which decides to launch the software modification process. Such entity may also be denoted as Software Modification Manager (SMM) herein below and may be given by an OSS, a BSS or an administrator, for example. The managing entity may not necessarily perform the instantiating, redirecting and terminating actions defined by steps (a) to (d) itself, but may rather delegate performing these actions to other entities in the VNF based environment. The managing entity may as such be said to "trigger" performing the respective actions defined by steps (a) to (d). As a mere example, in accordance with step (a), the managing entity may not instantiate the target VNF itself, but rather instruct the target VNFM to instantiate the target VNF. Triggering instantiating the target VNF may thus include triggering instantiating the target VNF via the target VNFM. It will be understood, however, that the managing entity may also fully perform one or more of the actions defined by steps (a) to (d) itself.

When it comes to implementing the instantiation of the target VNF, triggering instantiating the target VNF may include triggering updating an NSD to reflect a redundant traffic path via both the source VNF and the target VNF, and triggering deploying the NSD in the VNF based environment. Both updating the NSD and deploying the NSD may be performed via an NFVO of the VNF based environment, for example.

When traffic is redirected from the source VNF to the target VNF using the redundant traffic path when both the source VNF and the target VNF are executed in parallel, any suitable traffic redirection schedule may be employed, provided that all traffic is eventually handled by the target VNF and no traffic is handled by the source VNF anymore. In accordance with the traffic redirection schedule, traffic may be redirected successively (e.g., gradually) from the source VNF to the target VNF, for example. In one particular variant, in accordance with the traffic redirection schedule, requests initially served by the source VNF may be served by the source VNF until their completion and requests initiated after instantiation of the target VNF may be directed to the target VNF. The traffic redirection schedule may be different depending on the underlying NS and its functionality. As such, in order to identify a suitable redirection schedule, the managing entity may need to ascertain relevant information from different entities in the VNF based environment, such as from an EM or a Software Defined Network Controller (SDNC), for example.

When it comes to implementing the termination of the source VNF, triggering terminating the source VNF may include triggering updating an NSD to reflect removal of the redundant traffic path via both the source VNF and the target VNF, and triggering deploying the NSD in the VNF based environment. Both updating the NSD and deploying the NSD may be performed via an NFVO of the VNF based environment, for example.

In case of failures occurring during the replacement of the source VNFM by the target VNFM, in particular in case of failures involving the new components, i.e., the target VNF and the target VNFM, appropriate failure resolution mechanisms may be provided. In one such variant, the method may further comprise triggering performing a rollback of one or more of steps (a) to (d) in reverse order in case of a failure of at least one of the target VNF and the target VNFM. It will be understood that the particular steps to be rolled back may depend on the stage of the replacement process at which the failure occurs and that only those steps may need to be rolled back which have already been performed. As such, triggering performing the rollback may comprise, when at least one of the source VNF and the source VNFM are already terminated, triggering instantiating the at least one of the source VNF and the source VNFM, and triggering redirecting traffic from the target VNF to the source VNF, in order to thereby rollback steps (d), (c) and (b) and get the source VNF and the source VNFM operative again. The rollback may further comprise triggering terminating the target VNF in order to rollback step (a) as well, and triggering removing the target VNFM if the target VNFM was instantiated as a new target VNFM instance. The rollback may generally correspond to a graceful and non-disruptive resolution mechanism.

In another variant of a failure resolution mechanism, the method may further comprise triggering defining, prior to triggering instantiating the target VNF, a restoration point from which operation can be resumed in case of a failure of at least one of the target VNF and the target VNFM. Triggering defining the restoration point may include one of creating the restoration point as a new restoration point comprising a backup of at least one of the source VNF and the source VNFM, and triggering selecting the restoration point among existing restoration points each comprising a backup of at least one of the source VNF and the source VNFM. In case of failure resolution using a restoration point, the system may be reloaded and restarted from the backup. More specifically, a restoration point may be created as a backup of the source VNF and the source VNFM as well as their context in such a way that this source VNF and this source VNFM may be restarted from the backup with enough context to resume operation even after a crash. It will be understood that the resumption operation from a backup may result in a temporary service disruption. If a failure is detected (e.g., any of the target VNF and the target VNFM crashes, returns with an error, etc.), the managing entity may decide whether it executes a rollback or resumes the operation from a restoration point. Since the use of restoration points may result in service disruptions, the rollback may be the preferred option and the use of a restoration point may be applied as a fallback in case the rollback fails, for example.

In accordance with the method described herein, after the source VNF has been terminated, the source VNFM may be terminated as well because the source VNFM may not be needed anymore. It will be understood that this may only apply if the source VNFM has no further VNFs under management. The source VNFM may as such be terminated (e.g., only) if the source VNFM does not manage any other VNFs. If the source VNF is one of a plurality of source VNFs managed by the source VNFM, the source VNFM may not be terminated until all VNFs under management of the source VNFM are terminated. The source VNF may thus be one of a plurality of source VNFs managed by the source VNFM, wherein steps (a) to (c) may be performed for each of the source VNFs to redirect traffic to respectively instantiated target VNFs before triggering terminating the source VNFM in accordance with step (d).

Figure 4A:
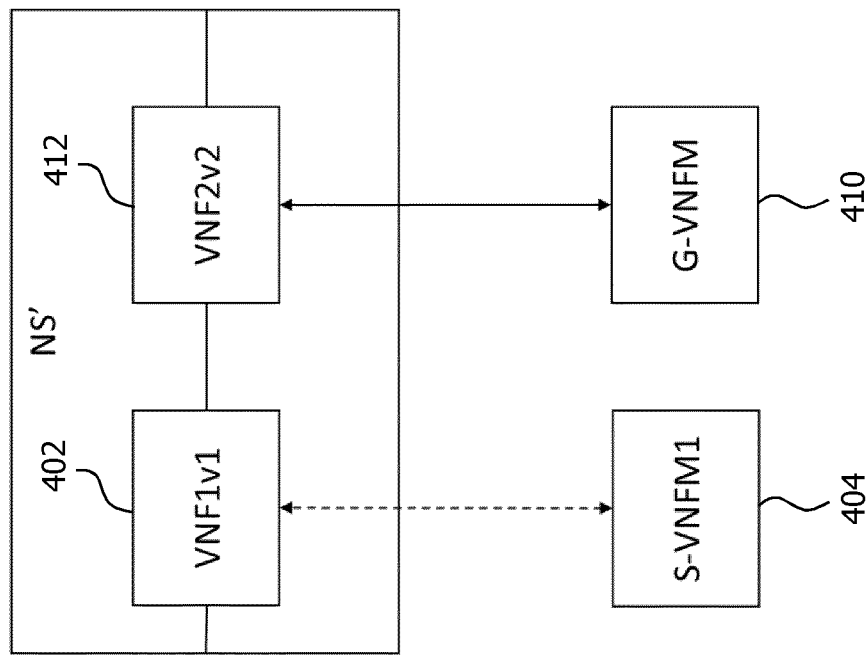
FIGS. 4*a* and 4*b* illustrate an exemplary use case in which the technique presented herein is employed.
Figure 4A:
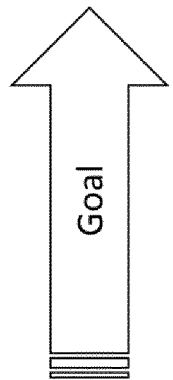
Figure 4A:
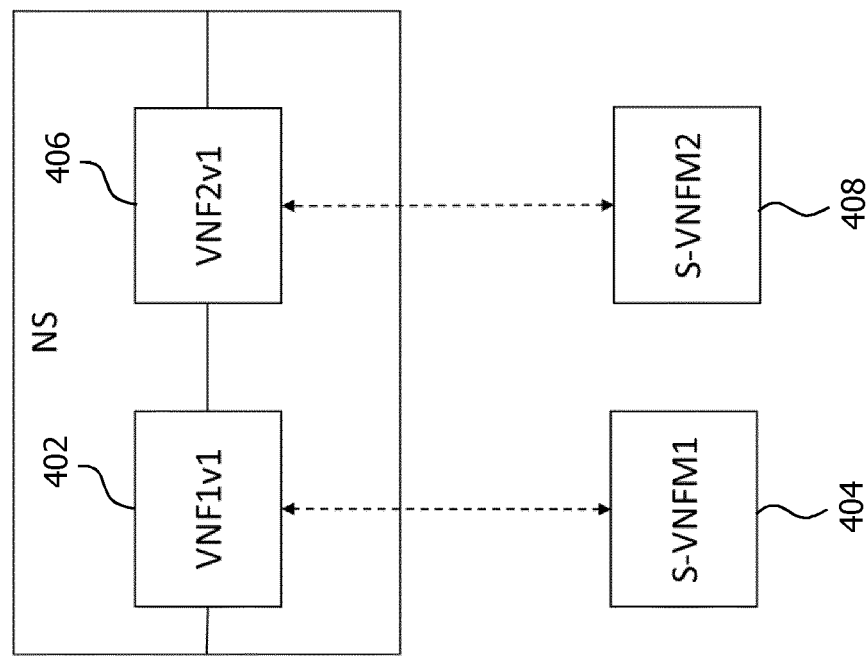
Figure 4B:
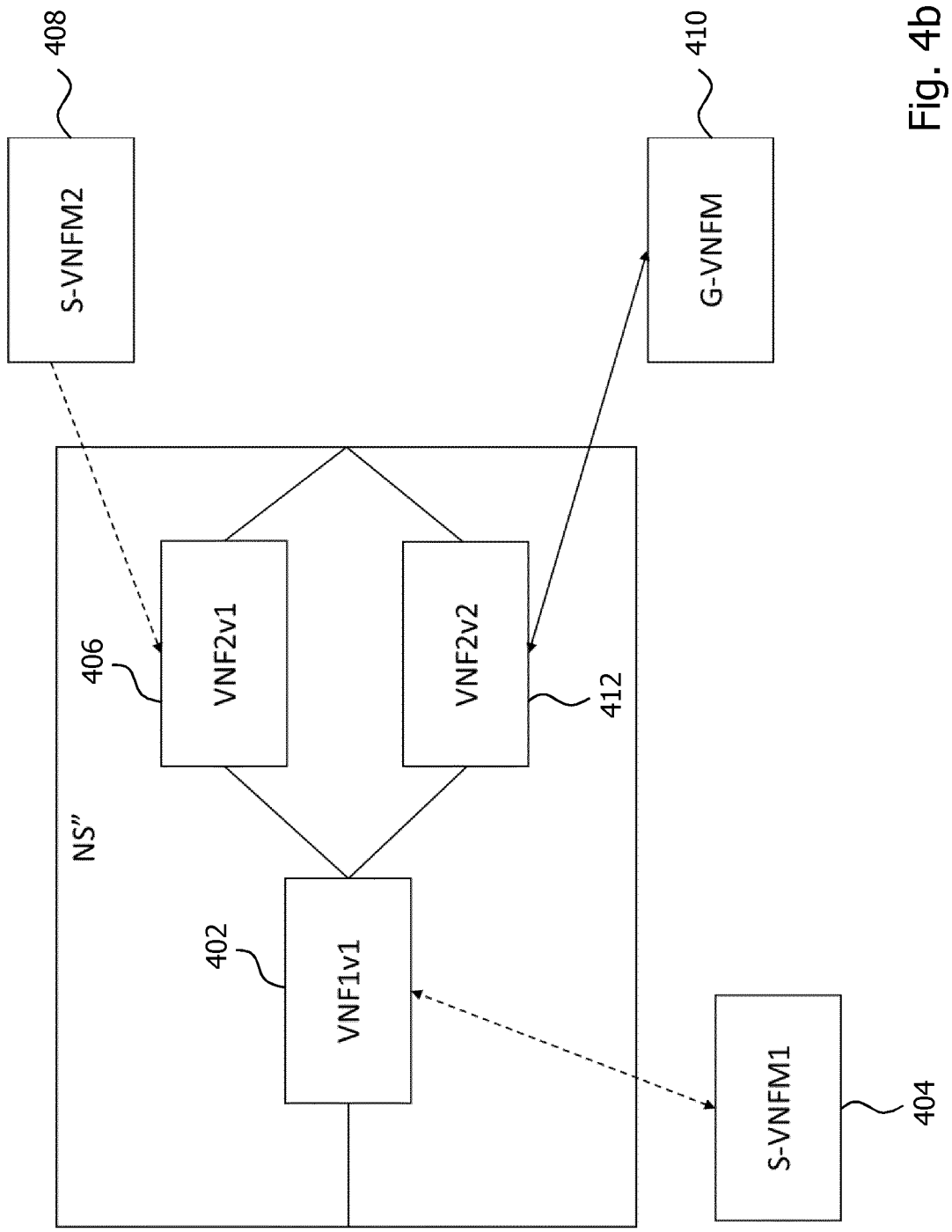

FIGS. 4a and 4b illustrate an exemplary use case in which the technique presented herein is employed. The use case relates to a replacement procedure in which an S-VNFM is to be replaced by a G-VNFM in an exemplary VNF based environment comprising a network service NS including two VNFs. As shown on the left-hand side of FIG. 4a, a first VNF 402 of a first version denoted as "VNF1v1" is managed by a first S-VNFM 404 denoted as "S-VNFM1" and a second VNF 406 of a first version denoted as "VNF2v1" is managed by a second S-VNFM 408 denoted as "S-VNFM2". As the first and second S-VNFMs 404 and 408 are specific VNFMs, they use proprietary interfaces (i.e., interfaces differing from standardized interfaces) to manage their respective VNFs 402 and 406, as indicated by the dashed lines in FIG. 4a. As shown on the right-hand side of FIG. 4a, the goal of the replacement procedure is to replace S-VNFM2 408 by a G-VNFM 410, which—in order to avoid service disruption—necessitates a replacement of VNF2v1 406 by a new version of the second VNF, namely "VNF2v2" 412, which supports a standardized interface to generic VNFMs and thereby allows interacting with the G-VNFM 410, as indicated by a solid line in FIG. 4a. The resulting network service is denoted NS' in FIG. 4a.

FIG. 4b illustrates an intermediate state in the transitioning procedure between the two states depicted in FIG. 4a. In the transitioning procedure, the G-VNFM 410 is instantiated (or an existing G-VNFM 410 with enough capacity is selected) to manage VNF2v2 412 which can interact with the G-VNFM 410. To avoid service impact, VNF2v2 412 is added to the network service (resulting in a network service NS") in a manner so that it is executed in parallel to VNF2v1 406 and a redundant traffic path is provided via both VNF2v1 406 and VNF2v2 412 from VNF1v1 402. Traffic coming from VNF1v1 402 is then redirected according to an appropriate schedule, as described above. For example, new requests can be sent to VNF2v2 412, while the old requests may be served to their completion by VNF2v1 406. Once all the traffic is served by VNF2v2 412, VNF2v1 406 can be removed together with its managing S-VNFM2 408, thereby resulting in the state shown on the right-hand side of FIG. 4*a*.

If the goal of the software modification is to transition the whole system from S-VNFM managed deployment to G-VNFM managed deployment, a similar procedure may also be applied to VNF1v1 402 and its managing S-VNFM1 404 to transfer management to a G-VNFM as well. Generally, it is to be noted that the architectural change may be hidden throughout the transition process and that no service impact may thus be visible. VNF2v2 412 may include all the special functionality that may have been implemented before by S-VNFM2 408 in VNF2v1 406 and may additionally be capable of interacting with the G-VNFM 410. The architectural change may thus also be considered as a non-backward compatible interface change which is handled by the simultaneous software modification of the VNFM and its managed VNFs.

In the following, a description of a more detailed software modification process performed by an SMM and involving replacement of an S-VNFM by a G-VNFM is provided. It will be understood that the following description is merely exemplary and that modifications of the process are generally conceivable in line with the more general method described above.

The following pre-conditions may need to be satisfied before the process may begin:

As a first pre-condition, the target VNF software version may need to be available, e.g., the target VNF software version may need to have been delivered for the source VNF and it may need to reference the G-VNFM as manager. Other external interfaces may remain the same as of the source VNF. As a second pre-condition, the G-VNFM software version may need to be available, e.g., a VNFM software version which implements a standardized interface towards VNFs may need to be available. As a third pre-condition, the SMM may need to operate normally and have a software modification execution plan, e.g., the SMM may need to know how to interact with other entities of the VNF based environment, such as the NFVO, the S-VNFM and the G-VNFM to implement the software modification. As a fourth pre-condition, the S-VNFM and the source VNF may need to operate normally. As a fifth pre-condition, sufficient resources may need to be available, e.g., any compute/storage/network resources needed for the execution of the software modification may need to be available. No assumption may need to be made on the kind of resources required, e.g., whether they are physical resources, cloud resources, or the like.

The software modification process may then comprise the following steps:

In step 1, the SMM may decide to launch the software modification process. In step 2, the SMM may take appropriate steps to prepare the environment for the planned software modification of the source VNF and the S-VNFM including defining a restoration point for failure recovery. In the subsequent steps, the SMM may also track resources needed to enable a software rollback in case of a failure. In step 3, the SMM may check whether a G-VNFM is available to manage an additional VNF or otherwise instantiate a new G-VNFM instance and verify that it is operational. In step 4, the SMM may set peering information in the G-VNFM as well as in the NFVO and unlock the G-VNFM. In step 5, the G-VNFM may peer with the NFVO and, in step 6, the SMM may update, via the NFVO, the relevant NSD with the redundant traffic path including the target VNF and associate the NSD with the relevant NS instance. In step 7, the NFVO requests the G-VNFM to instantiate the target VNF and a VIM to instantiate the Virtual Links (VLs) required to set the redundant path. In step 8, the G-VNFM and the VIM report back to the NFVO about the instantiation of the target VNF and its associated VLs. In step 9, the NFVO reports to the SMM about the completion of the deployment of the modified NS. In step 10, the SMM performs the steps necessary to redirect the traffic from the source VNF to the target VNF according to a redirection schedule indicated in the software modification execution plan. The redirection schedule may be different depending on the NS and its functionality, and the SMM may need to interact with different entities, such as an EM, an SDNC, or the like, to obtain the relevant information needed to carry out the redirection process. In step 11, when no traffic is handled by the source VNF anymore, the SMM may update, via the NFVO, the NSD by removing the path of the source VNF and associate the NSD with the NS instance. In step 12, the NFVO may request the S-VNFM to terminate the source VNF and the VIM to remove the VLs not needed anymore. In step 13, the S-VNFM and the VIM may report back to the NFVO about the removal of the source VNF and its associated VLs. In step 14, the NFVO may report to the SMM about the completion of the deployment of the modified NS. In step 15, the SMM may lock and terminate the S-VNFM, provided that it does not manage any other VNFs. In step 16, the SMM may perform the steps necessary to verify that the target VNF and the G-VNFM are operating normally and, in step 17, the SMM may commit the software modification by releasing the resources used to enable the software rollback.

If a software rollback operation is needed in case of a failure at any of the steps of the software modification process, the following exemplary rollback procedure may be performed:

If a failure occurs in step 16 of the software modification process, the SMM may decide to launch the software rollback process and take appropriate steps to prepare the system for the rollback of the target VNF and the G-VNFM. The SMM may then instantiate a new S-VNFM instance and verify that it is operational. If the SMM detects—at this or any of the subsequent steps of the rollback procedure—a failure of the source VNF or the S-VNFM (e.g., any of them crashes, returns with an error, etc.), the SMM may resume operation from the restoration point defined by the software modification process. After the instantiation of the new S-VNFM, the SMM may set the peering information in the S-VNFM as well as in the NFVO and unlock the S-VNFM. Afterwards, the S-VNFM may peer with the NFVO. The SMM may then update, via the NFVO, the NSD with the redundant traffic path including the source VNF and associate the NSD with the NS instance (this may be the first step in the rollback procedure if a failure occurs in step 11 of the software modification process). The NFVO may then request the S-VNFM to instantiate the source VNF and the VIM to instantiate the VLs required to set the redundant path. After that, the S-VNFM and the VIM report back to the NFVO about the instantiation of the source VNF and its associated VLs. The NFVO may then report to the SMM about the completion of the deployment of the modified NS. After that, the SMM may perform the steps necessary to redirect the traffic to the source VNF according to a redirection schedule (this may be the first step in the rollback procedure if a failure occurs in step 10 of the software modification process). Similar to the software modification process, the schedule for redirecting the traffic from the target VNF to the source VNF may be different depending on the NS and its functionality. Also, the SMM may need to interact with different entities, such as an EM, an SDNC, or the like, to obtain the relevant information needed to carry out the redirection. When no traffic is handled by the target VNF anymore, the SMM may update, via the NFVO, the NSD by removing the path of the target VNF and associate the NSD with the NS instance. The NFVO may then request the G-VNFM to terminate the target VNF and the VIM to remove the VLs not needed anymore (this may be the first step in the rollback procedure if a failure occurs in step 7 or 8 of the software modification process). After that, the G-VNFM and the VIM may report back to the NFVO about the removal of the target VNF and its associated VLs. The NFVO may then report to the SMM about the completion of the deployment of the modified NS, and the SMM may lock and terminate the G-VNFM if it is not used for any other VNFs. After that, the SMM may perform the steps necessary to verify that the source VNF and the S-VNFM are operating normally and, finally, the SMM may commit by releasing the resources that enabled the software rollback.

As has become apparent from the above, the present disclosure provides a technique for replacing a source VNFM by a target VNFM without service impact. The technique may be employed as part of a software modification process transitioning at least a subsystem of the VNF based environment from a source VNFM managed deployment to a target VNFM managed deployment. The technique may as such be employed to generalize and/or centralize the management of VNFs without any service disruption. The technique may generally cope with the fact that software modifications may depend on the availability of new software versions for both the managed VNFs and the NFV-MANO functional entities so that they can interact properly after the completion of the software modification. Using the proposed technique, it may therefore be ensured that the dependency between the NFV-MANO functional entities and their managed VNFs is satisfied, regardless of whether the software modification completes successfully or it needs to be rolled back due to some failure or due to an administrative decision, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for replacing a Virtualized Network Function Manager (VNFM) managing a Virtualized Network Function (VNF) in a VNF based environment, the method comprising the steps of:
    (a) instantiating a target VNF, the target VNF being managed by a target VNFM and being executed in parallel to a source VNF managed by a source VNFM, the source and target VNFMs being responsible for lifecycle management of the source and target VNFs;
    (b) redirecting traffic from the source VNF to the target VNF in accordance with a traffic redirection schedule;
    (c) terminating the source VNF when redirecting traffic from the source VNF to the target VNF is complete; and
    (d) terminating the source VNFM.

2. The method of claim 1, wherein the source VNFM is replaced by the target VNFM as part of a software modification process transitioning at least a subsystem of the VNF based environment from a source VNFM managed deployment to a target VNFM managed deployment.

3. The method of claim 1, wherein the source VNF does not support interaction with the target VNFM and wherein the target VNF is an updated version of the source VNF which supports interaction with the target VNFM.

4. The method of claim 1, wherein the source VNFM is a Specific VNFM (S-VNFM) and the target VNFM is a Generic VNFM (G-VNFM).

5. The method of claim 1, wherein the source VNFM is a Generic VNFM (G-VNFM) and the target VNFM is an updated version of the G-VNFM.

6. The method of claim 1, further comprising one of:
    instantiating the target VNFM as a new target VNFM instance, and
    selecting the target VNFM among existing target VNFM instances having sufficient capacity to manage the target VNF.

7. The method of claim 1, wherein instantiating the target VNF includes instantiating the target VNF via the target VNFM.

8. The method of claim 1, wherein instantiating the target VNF includes:
    updating a Network Service Descriptor (NSD) to reflect a redundant traffic path via both the source VNF and the target VNF, and
    deploying the NSD in the VNF based environment.

9. The method of claim 1, wherein, in accordance with the traffic redirection schedule, traffic is redirected successively from the source VNF to the target VNF.

10. The method of claim 1, wherein, in accordance with the traffic redirection schedule, requests initially served by the source VNF are served by the source VNF until their completion and requests initiated after instantiation of the target VNF are directed to the target VNF.

11. The method of claim 1, wherein terminating the source VNF includes:
    updating a Network Service Descriptor (NSD) to reflect removal of a redundant traffic path via both the source VNF and the target VNF, and
    deploying the NSD in the VNF based environment.

12. The method of claim 1, further comprising:
    performing a rollback of one or more of steps (a) to (d) in reverse order in case of a failure of at least one of the target VNF and the target VNFM.

13. The method of claim 12, wherein performing the rollback comprises:
    when at least one of the source VNF and the source VNFM are already terminated,
    instantiating the at least one of the source VNF and the source VNFM, and
    redirecting traffic from the target VNF to the source VNF.

14. The method of claim 1, further comprising:
    defining, prior to instantiating the target VNF, a restoration point from which operation can be resumed in case of a failure of at least one of the target VNF and the target VNFM.

15. The method of claim 14, wherein defining the restoration point includes one of:
    creating the restoration point as a new restoration point comprising a backup of at least one of the source VNF and the source VNFM, and
    selecting the restoration point among existing restoration points each comprising a backup of at least one of the source VNF and the source VNFM.

16. The method of claim 1, wherein the source VNFM is terminated if the source VNFM does not manage any other VNF.

17. The method of claim 1, wherein the source VNF is one of a plurality of source VNFs managed by the source VNFM, wherein steps (a) to (c) are performed for each of the source VNFs to redirect traffic to respectively instantiated target VNFs before terminating the source VNFM.

18. A non-transitory computer readable media comprising instructions for performing the method of claim 1.

19. A computing unit for replacing a source Virtualized Network Function Manager (VNFM) managing a source Virtualized Network Function (VNF) in a VNF based environment by a target VNFM, the computing unit comprising at least one processor and at least one memory, the at least one memory containing instructions executable by the at least one processor such that the computing unit is operable to perform the method of claim 1.

20. A system comprising a computing unit according to claim 19.

* * * * *